Oct. 18, 1932.  H. L. HALBACH  1,883,734
PROCESS AND APPARATUS FOR MAKING SHEET GLASS
Filed Jan. 27, 1931   2 Sheets-Sheet 1
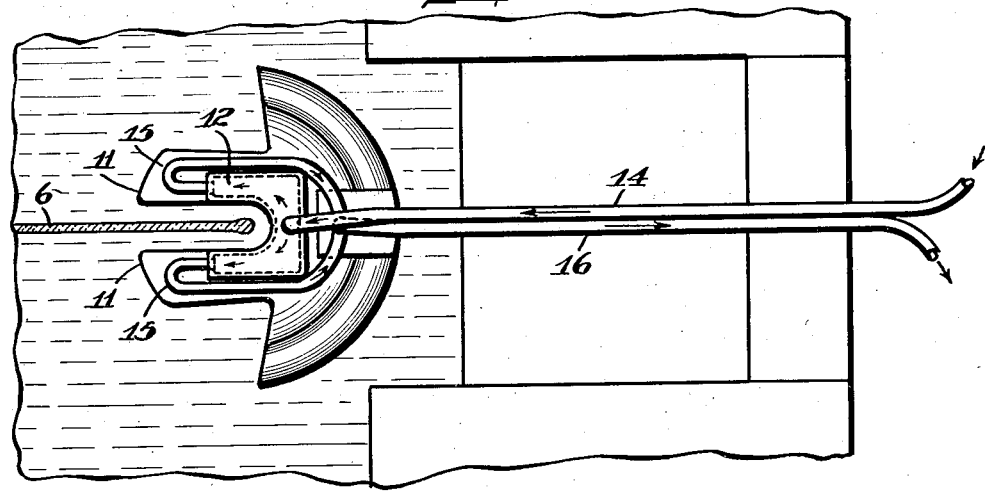
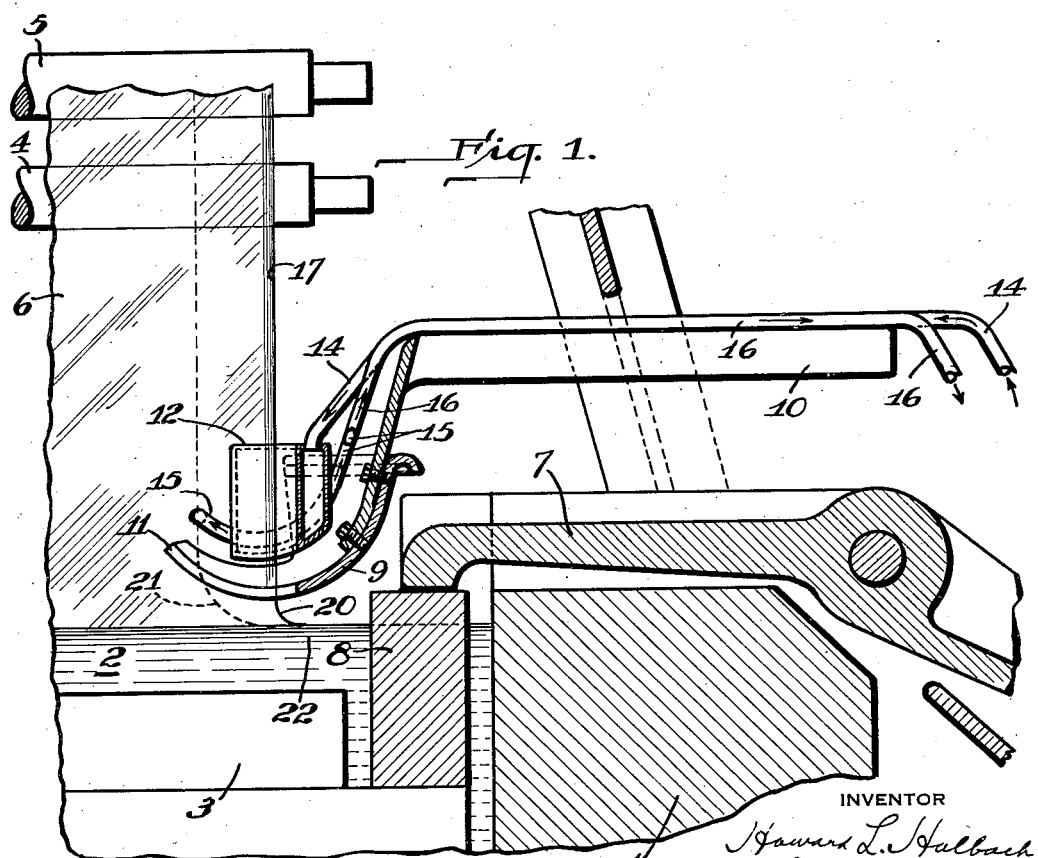
INVENTOR
Howard L. Halbach
by
James C. Bradley
atty Oct. 18, 1932.   H. L. HALBACH   1,883,734
PROCESS AND APPARATUS FOR MAKING SHEET GLASS
Filed Jan. 27, 1931   2 Sheets-Sheet 2
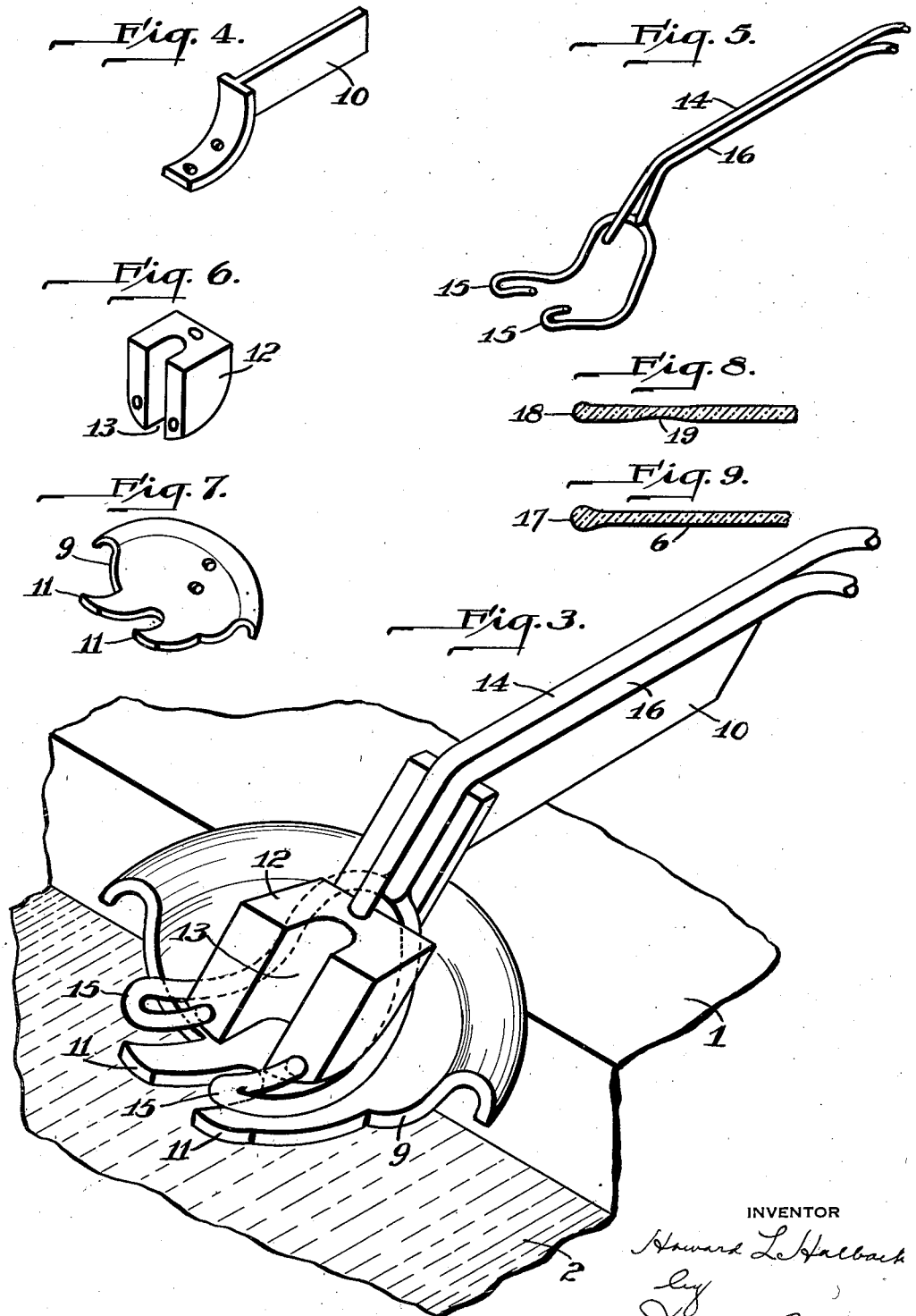

Patented Oct. 18, 1932

1,883,734

UNITED STATES PATENT OFFICE

HOWARD L. HALBACH, OF CLARKSBURG, WEST VIRGINIA, ASSIGNOR TO PITTSBURGH PLATE GLASS COMPANY, A CORPORATION OF PENNSYLVANIA

PROCESS AND APPARATUS FOR MAKING SHEET GLASS

Application filed January 27, 1931. Serial No. 511,477.

The invention relates to a process and apparatus for making sheet glass, and particularly to means applicable, where a continuous sheet is drawn from an open pool or bath, for maintaining the width of the sheet. It involves an improvement over the edge holding apparatus of the Slingluff Patent No. 1,549,513. The apparatus of such patent is an effective and successful means for accomplishing the desired function, but the edge produced on the sheet is somewhat hard, and in trimming the sheets, the glass must be cut back from the edge several inches so that there is a considerable loss in production due to this cause. Further, when a crack develops in the sheet, it has a tendency to continue longitudinally thereof parallel to the edge instead of running out laterally through the edge, this being due to the hardness or temper in the edge which tends to prevent transverse cracking. One of the objects of the present invention is to overcome the foregoing difficulties by producing a softer edge, so that the sheet may be trimmed closer to the edge and so that any cracks which develop longitudinally of the glass will turn laterally through the edge and thus terminate. The softer edge is also less liable to develop fire cracks which result in more or less breakage. A further object of the invention is to shorten the curve or meniscus of the sheet where it emerges from the glass and thus somewhat increase the width of the sheet which can be drawn from a bath of a given width. A still further object of the invention is to maintain the body of glass from which the edge of the sheet emerges at a higher temperature, so that the collection of a body of glass at this point of gradually decreasing temperature resulting in a stoppage of the operation at definite intervals in order to reheat, is avoided. The foregoing and certain additional advantages are secured, one form of which is shown in the accompanying drawings, wherein:

Figure 1 is a transverse section through one side of a drawing tank with the invention applied thereto. Fig. 2 is a partial plan view and partial section. Fig. 3 is a perspective view on an enlarged scale. Figs. 4, 5, 6, and 7 are detail perspective views. And Figs. 8 and 9 are horizontal sections through the edges of two sheets, the edge shown in Fig. 8 being typical of that produced with the apparatus of the Slingluff patent heretofore referred to, and Fig. 9 being typical of that produced by the apparatus of the present application.

Referring to the drawings, 1 is a drawing tank or extension carrying a molten bath or pool of glass 2 in communication with a suitable melting tank (not shown); 3 is a draw bar of refractory metal, such as clay submerged in the bath; 4 and 5 are two of a series of drawing rollers covered with asbestos and suitably driven by means of which the sheet 6 is drawn continuously upward from the bath; and 7 is a device for depressing the draw bar, this being accomplished through the block 8 which rests upon the end of the draw bar. It will be understood that the construction at the other side of the glass sheet is the same as that shown and described in connection with Fig. 1 and that the edge holding device later described is the same at both edges of the sheet.

The edge holder comprises a concave plate of metal 9 supported by a bar 10 bolted thereto, suitable means (not shown) being provided for holding the bar 10 in any desired position of adjustment. The plate 9 is provided with a pair of forwardly projecting fingers 11, 11 preferably spaced apart about an inch and adapted to receive between them the edge of the glate sheet. The plate 9 is located just above the surface of the glass as illustrated in Fig. 1 so that as the sheet is drawn, the thickened edge of the meniscus of the sheet is pulled up into the slot and contacts with such slot on both sides thereof differing in this particular from the operation of the Slingluff patent heretofore referred to wherein the edge of the sheet in the normal operation of the device touched only one side of the sheet. The edge of the sheet has at its points of contact with the sides of the slot a slight degree of adherence and it is this contact or adherence which prevents narrowing of the sheet during the drawing operation.

Located just above the plate 9 is an elongated hollow box or container 12 which is designed to cool the edge of the sheet by radiation. This box has a slot 13 along one side which is designed to straddle the edge of the sheet as indicated in Fig. 2, the width of the slot being approximately the same as the width of the slot between the fingers 11, 11. Water is supplied to the box through a pipe 14 connected to the top thereof. A pair of hollow pipe arms 15, 15 are connected to the lower end of the box and project forwardly as indicated in Fig. 3. These arms then curve back and are connected at their rear ends to the outlet pipe 16. A cooling flow of water thus passes through the pipe 14, down through the box, forwardly through the pipe arms 15, 15, and then to the rear to the outlet pipe 16. The effect of this cooling device is to thicken up the edge of the sheet and cause the formation thereon of a bead 17, such as is shown in Fig. 9. The sheet is in this respect different from that produced by the apparatus of the Slingluff patent heretofore referred to and shown in Fig. 8 in which only a slight thickening of the edge at 18 occurred. In the formation of the Slingluff egde, a thin spot ordinarily developed about 5 inches from the edge of the sheet, as indicated at 19 in Fig. 8. In the present apparatus, the use of the cooler with the forwardly projecting arms 15, 15 eliminates this thin spot so that the glass may be trimmed closer to the edge giving an increased production. The use of the cooling device also causes a hardening of the sheet down to a point close to the glass so that the curve, as indicated at 20 (Fig. 1) is relatively sharp instead of forming a relatively long curve, as indicated at 21 in Fig. 1, which line 21 indicates the curvature assumed at the edge of the sheet when the cooling device is omitted. The use of the cooling device, therefore, gives an increased width of sheet due to the relatively short curve at 20. The formation of the bead 17 also involves an advantage as compared with the sheet shown in Fig. 8 which has very little or no bead in that the thicker edge is softer. This is due to the slower cooling incident to the larger volume of glass. The drawing of the thicker edge also results in withdrawing glass more rapidly from the area 22 (Fig. 1) adjacent the tank wall so that the glass at this point is maintained hotter due to the inflow of hot glass from the central portion of the tank than is the case where a thin edge is being drawn. This reduces the tendency of the glass at the side edges of the tank to devitrify and freeze up, such action resulting in the stopping of the drawing operation at certain intervals in order to recondition the glass at the sides of the tanks. With the present process and apparatus, the drawing operation may be continued indefinitely without stopping to reheat and recondition the glass at the edges of the tank. The softer edge incident to the bead reduces breakage and fire cracks as heretofore referred to and in case of a longitudinal crack in the sheet, such crack will turn outward through the edge of the sheet much quicker with a thick edge than with a thin one since the thinner edge is harder and resists the tendency of a crack to progress laterally through it. From the foregoing it will be seen that the results accomplished by the present invention are: (1) the production of a sheet which involves less breakage and a longer drawing period than with the original apparatus of this same type; (2) the production of a sheet which is of more uniform thickness from its center to its edge and which is somewhat wider than the sheet heretofore produced by the use of the Slingluff apparatus; and the production of a sheet having a softer edge which permits longitudinal cracks to run out to the edge of the sheet more quickly than with a harder edge, thus reducing the loss incident to longitudinal cracks in the sheet. The holding of the edge of the sheet against inward movement is also more secure, and the sheet is never released from its holding slot as sometimes occurred with the apparatus lacking the cooler when temperature conditions increased beyond normal.

What I claim is:

1. In combination with apparatus arranged to draw a glass sheet from an open pool of glass, of means for preventing inward movement of the edge of the sheet in said pool comprising a shielding plate spaced above the surface of the pool, but closely adjacent thereto and having a slot extending inward from its edge and fitting around the edge of the sheet, of a hollow box extending longitudinally of the sheet seated just above the plate and having a slot along one side fitting around the edge of the sheet but out of contact therewith, a pair of hollow arms projecting forwardly from the box on opposite sides of its slot, and means for circulating a cooling fluid through the box and through said arms.

2. In combination with apparatus arranged to draw a glass sheet from an open pool of glass, of means for preventing inward movement of the edge of the sheet in said pool comprising a concave shielding plate of metal spaced above the surface of the pool, but closely adjacent thereto and having a slot extending inward from its edge and fitting around the edge of the sheet, of a hollow box extending longitudinally of the sheet seated just above the plate and having a slot along one side fitting around the edge of the sheet but out of contact therewith, a pair of hollow arms projecting forwardly from the box on opposite sides of the sheet, and means for circulating a cooling fluid through said box and through said arms.

3. In combination with apparatus arranged to draw a glass sheet from an open pool of glass, of means for preventing inward movement of the edge of the sheet in said pool comprising a concave shielding plate of metal constituting approximately a quarter of a hollow sphere lying opposite the edge of the sheet just above the surface of the pool and provided with a pair of fingers projecting from the lower edge of the plate and straddling the edge of the sheet, hollow members lying in the curvature of the plate and along said fingers, and means for circulating a flow of liquid through said members.

4. In combination with apparatus arranged to draw a glass sheet from an open pool of glass, of means for preventing inward movement of the edge of the sheet in said pool comprising a concave shielding plate spaced above the surface of the pool but closely adjacent thereto and having a slot extending inward from its edge and adapted to fit around the edge of the sheet which is drawn, of a hollow box U-shape in cross section positioned just above the plate extending longitudinally of the sheet and having the legs thereof on opposite sides of said slot with the portion joining said legs in opposition to the edge of the sheet, and means for circulating a flow of liquid through said box.

5. A process of holding the edge of a sheet of glass which is drawn upwardly from a molten bath which consists in passing the edge through a slot in a metal shielding member located above the glass but so close thereto that the meniscus of the sheet at the edge touches both sides of the slot, and chilling said edge by radiation from a cooling body just above the shielding member so as to form a bead on such edge, said chill being applied uniformly around said bead for a substantial distance therealong.

In testimony whereof, I have hereunto subscribed my name this 22nd day of January, 1931.

HOWARD L. HALBACH.